US012651909B2

(12) United States Patent
Qian et al.

(10) Patent No.: US 12,651,909 B2
(45) Date of Patent: Jun. 9, 2026

(54) PHOTOVOLTAIC INVERTER, PHOTOVOLTAIC POWER GENERATION SYSTEM AND METHOD FOR CONTROLLING PHOTOVOLTAIC POWER GENERATION SYSTEM

(71) Applicant: Sungrow Power Supply Co., Ltd., Hefei (CN)

(72) Inventors: Yuandong Qian, Hefei (CN); Cheng Liang, Hefei (CN); Lei Dong, Hefei (CN); Tingkuan Wu, Hefei (CN); Guoqi Zhang, Hefei (CN); Jigui Feng, Hefei (CN)

(73) Assignee: Sungrow Power Supply Co., Ltd., Hefei (CN)

( * ) Notice: Subject to any disclaimer, the term of this patent is extended or adjusted under 35 U.S.C. 154(b) by 0 days.

(21) Appl. No.: 19/023,973

(22) Filed: Jan. 16, 2025

(65) Prior Publication Data

US 2025/0279652 A1     Sep. 4, 2025

(30) Foreign Application Priority Data

Feb. 29, 2024    (CN) .......................... 202410233733.3

(51) Int. Cl.
*H02J 3/00* (2026.01)
*G01R 31/40* (2020.01)
(Continued)

(52) U.S. Cl.
CPC ................ *H02J 3/38* (2013.01); *H02S 40/32* (2014.12); *H02J 2101/24* (2026.01)

(58) Field of Classification Search
CPC ........ H02J 3/38; H02J 2101/24; H02J 3/0012; H02J 3/381; H02S 40/32; G01R 31/42; G01R 31/52; Y02E 10/56; H02M 7/48
(Continued)

(56) References Cited

U.S. PATENT DOCUMENTS 11,614,475 B2 * 3/2023 Fischereder ........... G01R 15/04
                                                324/551
2017/0271878 A1 * 9/2017 Feng ....................... H02S 50/00
            (Continued)

FOREIGN PATENT DOCUMENTS

CN         106899036 A      6/2017
CN         206595721 U     10/2017
            (Continued)

OTHER PUBLICATIONS

Extended European Search Report for European Application No. 25151983.1, dated Jul. 7, 2025.

*Primary Examiner* — Elim Ortiz
(74) *Attorney, Agent, or Firm* — Wolf, Greenfield & Sacks, P.C.

(57)        ABSTRACT

A photovoltaic inverter, a photovoltaic power generation system and a method for controlling the photovoltaic power generation system are provided. In the method, during an anti-PID operation, only an anti-PID power supply is controlled to operate, and a voltage of a DC bus is boosted by using the anti-PID power supply, so as to suppress the PID effect. During insulation detection, both the anti-PID power supply and a target detection resistor are controlled to operate, voltages to the ground of a position of the photovoltaic inverter to which the target detection resistor is connected under different conditions are obtained by controlling the anti-PID power supply, so as to perform insulation detection by using the anti-PID power supply. Then, an insulation impedance to the ground of the photovoltaic inverter can be calculated.

18 Claims, 8 Drawing Sheets

(51) Int. Cl.
    *H02J 3/38*       (2026.01)
    *H02S 40/32*      (2014.01)
    *H02J 101/24*     (2026.01)

(58) Field of Classification Search
    USPC ....... 324/764.01; 307/82, 31, 80, 43, 84, 64,
                   307/11, 28, 17, 18, 85, 52, 66, 23;
                          700/286, 295, 291
    See application file for complete search history.

(56)                 References Cited

U.S. PATENT DOCUMENTS

2022/0268822 A1 *   8/2022   Ju ......................... G01R 27/18
2022/0407456 A1 *  12/2022   Wan ...................... H02S 50/00

FOREIGN PATENT DOCUMENTS

CN         115001391 A     9/2022
CN         218040814 U  * 12/2022
CN         219513804 U     8/2023
EP           4270710 A1 * 11/2023   ......... G01R 31/1227

* cited by examiner

PHOTOVOLTAIC INVERTER, PHOTOVOLTAIC POWER GENERATION SYSTEM AND METHOD FOR CONTROLLING PHOTOVOLTAIC POWER GENERATION SYSTEM

The present application claims priority to China Patent Application No. 202410233733.3, titled "PHOTOVOLTAIC INVERTER, PHOTOVOLTAIC POWER GENERATION SYSTEM AND METHOD FOR CONTROLLING PHOTOVOLTAIC POWER GENERATION SYSTEM", filed on Feb. 29, 2024 with the China National Intellectual Property Administration, which is incorporated herein by reference in its entirety.

FIELD

The present disclosure relates to the technical field of power electronics, and in particular to a photovoltaic inverter, a photovoltaic power generation system and a method for controlling the photovoltaic power generation system.

BACKGROUND

In the process of photovoltaic power generation, a photovoltaic inverter converts energy outputted by a photovoltaic sub-array connected to the photovoltaic inverter into a sine-wave current with a same frequency and a same phase as a power grid, and feeds the sine-wave current into the power grid. In this process, a potential induced degradation (PID) effect is generated on a photovoltaic panel due to the characteristics of the photovoltaic panel, leading to a gradual deterioration of the operation performance of the photovoltaic panel, eventually resulting in the loss of power generation capacity. Therefore, the PID effect is to be suppressed during operation of the photovoltaic inverter.

In the conventional technology, an anti-PID circuit is usually provided or a DC side is directly connected to ground, to implement an anti-PID operation, boosting a voltage of a negative electrode of the photovoltaic module in the photovoltaic sub-array relative to the ground, so as to suppress the PID effect of the photovoltaic panel.

However, in the process of the anti-PID operation of the photovoltaic inverter, an insulation impedance of the system to ground fails to be detected due to the existence of a grounding loop. As a result, insulation detection conflicts with and is incompatible with the anti-PID operation.

SUMMARY

In view of this, a photovoltaic inverter, a photovoltaic power generation system and a method for controlling the photovoltaic power generation system are provided, to achieve the compatibility between insulation detection and an anti-PID operation, and to save costs.

In order to achieve the foregoing objective, the following technical solutions are provided according to the present disclosure.

In a first aspect, a method for controlling a photovoltaic power generation system is provided according to the present disclosure. In the photovoltaic power generation system, an anti-potential induced degradation (anti-PID) power supply is arranged between ground and a direct-current (DC) bus of a photovoltaic inverter, at least one detection resistor connected in series with the anti-PID power supply is arranged between at least one side of the photovoltaic inverter and the ground, and the anti-PID power supply and the detection resistor are provided with respective switches. The method includes:

controlling only the anti-PID power supply to operate during an anti-PID operation;

controlling both the anti-PID power supply and a target detection resistor of the detection resistor to operate during insulation detection;

obtaining voltages to the ground of a position of the photovoltaic inverter to which the target detection resistor is connected under different conditions by controlling the anti-PID power supply; and calculating an insulation impedance to the ground of the photovoltaic inverter based on the obtained voltages, a voltage outputted by the anti-PID power supply and a resistance value of the target detection resistor.

In a second aspect, a photovoltaic inverter is further provided according to the present disclosure, which includes an inverter circuit, an anti-potential induced degradation (anti-PID) circuit, a voltage detection module, and a controller; where a direct-current (DC) side of the inverter circuit is connected to a DC bus, and an alternating-current (AC) side of the inverter circuit is configured to connect a power grid and/or a load;

the anti-PID circuit includes an anti-PID power supply and at least one detection resistor connected in series with the anti-PID power supply, and the anti-PID power supply and the detection resistor are provided with respective switches;

the anti-PID power supply is arranged between the DC bus and ground, and the at least one detection resistor is arranged between at least one side of the photovoltaic inverter and the ground;

the inverter circuit and the respective switches are controlled by the controller;

the voltage detection module is configured to detect a voltage to the ground of a position of the photovoltaic inverter to which a target detection resistor of the at least one detection resistor is connected and a voltage outputted by the anti-PID power supply, and output the detected voltages to the controller; and the controller is configured to perform the method for controlling the photovoltaic power generation system according to any one of the first aspect.

In a third aspect, a photovoltaic power generation system is provided according to the present disclosure, which includes a photovoltaic array and at least one photovoltaic inverter connected to the photovoltaic array; and the photovoltaic inverter is the photovoltaic inverter according to any one of the second aspect described above.

BRIEF DESCRIPTION OF THE DRAWINGS

In order to more clearly illustrate technical solutions in embodiments of the present disclosure or in the conventional technology, the drawings to be used in the description of the embodiments or the conventional technology are briefly described below. Apparently, the drawings in the following description show only some embodiments of the present disclosure, and other drawings may be obtained by those skilled in the art from the drawings without any creative work.

DETAILED DESCRIPTION

The technical solutions according to the embodiments of the present disclosure are described clearly and completely as follows in conjunction with the drawings in the embodiments of the present disclosure. It is apparent that the described embodiments are only some of the embodiments according to the present disclosure, rather than all the embodiments. Any other embodiments obtained by those skilled in the art based on the embodiments of the present disclosure without any creative work fall within the protection scope of the present disclosure.

The terms "include", "comprise" or any other variants thereof are intended to be non-exclusive. Therefore, a process, method, article or device including a series of elements includes not only these elements but also other elements that are not clearly enumerated, or further includes elements inherent in the process, method, article or device. Unless expressively limited, the statement "including a . . . " does not exclude the case that other similar elements may exist in the process, method, article or device including the series of elements.

A method for controlling a photovoltaic power generation system is provided according to the present disclosure, to achieve the compatibility between insulation detection and the anti-PID operation, and to save costs.

In the photovoltaic power generation system, an anti-PID power supply is arranged between a DC bus of a photovoltaic inverter and the ground. In practical applications, the anti-PID power supply is arranged between a negative electrode of the DC bus and the ground, or arranged between a positive electrode of the DC bus and the ground, depending on requirements of the application scenario. Hereinafter, the anti-PID power supply is arranged between the negative electrode of the DC bus and the ground.

Figure 1:
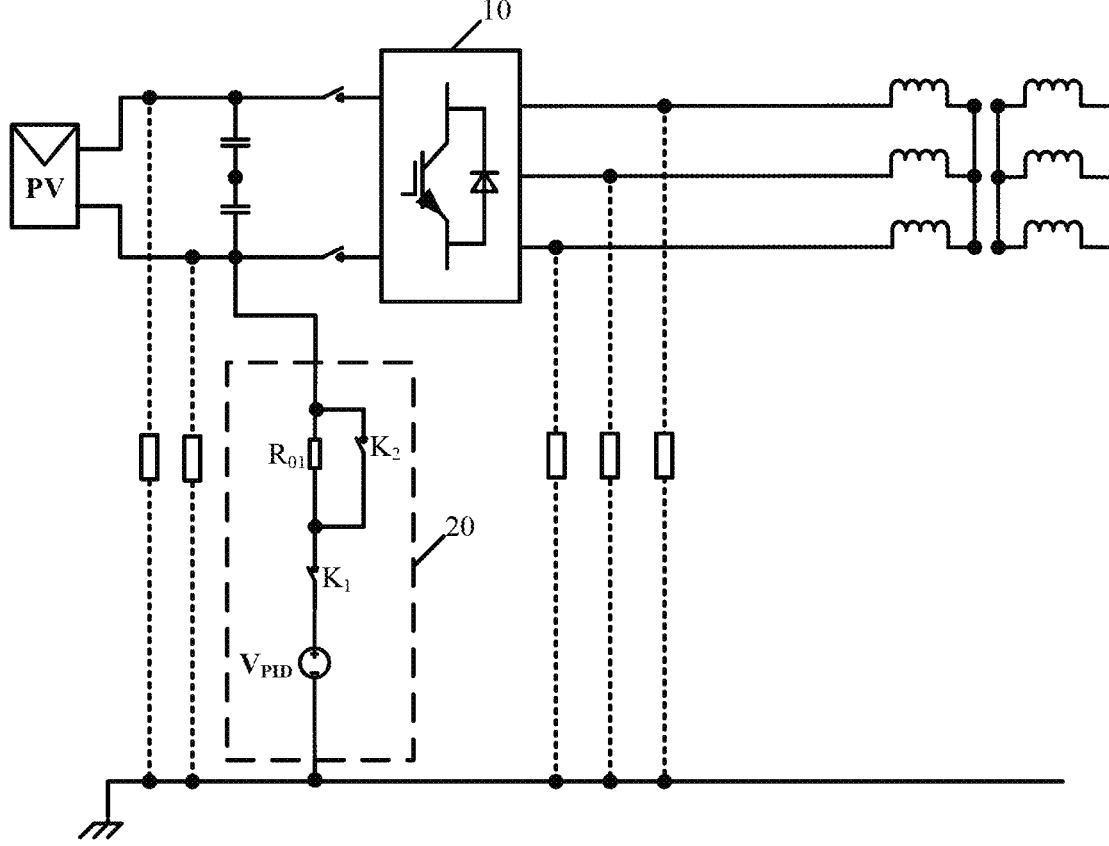
FIG. 1 is a schematic structural diagram of a photovoltaic inverter according to an embodiment of the present disclosure.
Figure 2:
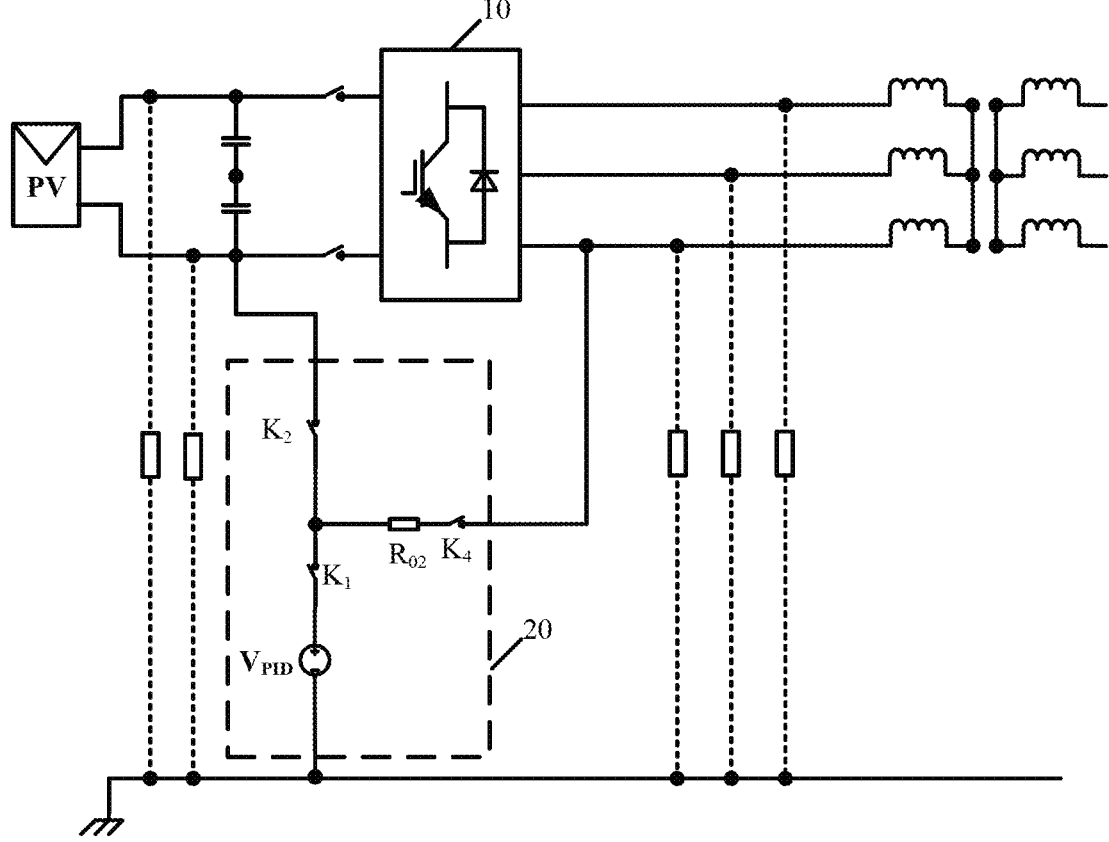
FIG. 2 is a schematic structural diagram of a photovoltaic inverter according to another embodiment of the present disclosure.
Figure 3:
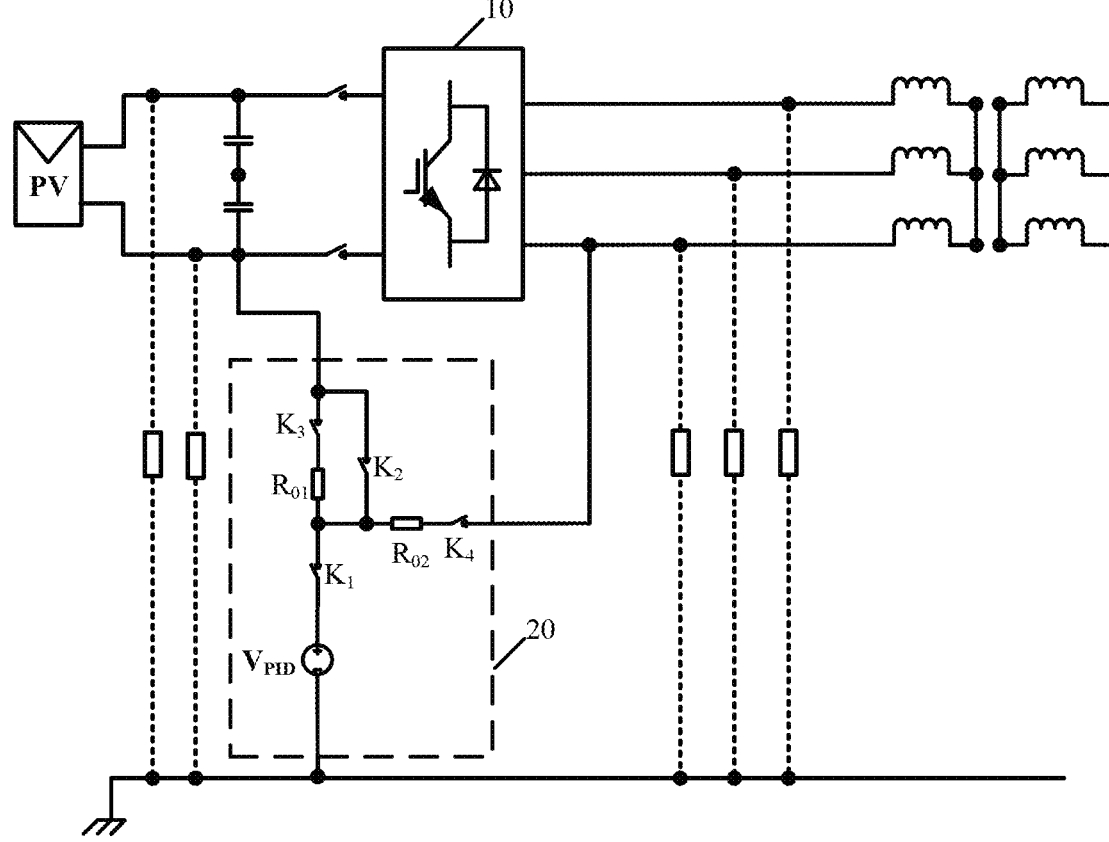
FIG. 3 is a schematic structural diagram of a photovoltaic inverter according to another embodiment of the present disclosure.

Moreover, a detection resistor connected in series with the anti-PID power supply is further arranged between the ground and at least one side of the photovoltaic inverter, that is, at least one of a DC side and an AC side of the photovoltaic inverter. As shown in FIG. 1, the negative electrode of the DC bus is connected to the ground through an anti-PID power supply $V_{PID}$ and a detection resistor $R_{01}$ connected in series. In an embodiment, as shown in FIG. 2, the negative electrode of the DC bus is connected to the ground through the anti-PID power supply $V_{PID}$, and one phase of the AC side of the photovoltaic inverter is connected to the ground through the anti-PID power supply $V_{PID}$ and a detection resistor $R_{02}$ connected in series. In an embodiment, as shown in FIG. 3, the negative electrode of the DC bus is connected to the ground through the anti-PID power supply $V_{PID}$ and the detection resistor $R_{01}$ connected in series, and one phase of the AC side of the photovoltaic inverter is connected to the ground through the anti-PID power supply $V_{PID}$ and the detection resistor $R_{02}$ connected in series. Moreover, the anti-PID power supply $V_{PID}$, the detection resistor $R_{01}$ and the detection resistor $R_{02}$ are provided with respective switches. As shown in FIG. 1, the anti-PID power supply $V_{PID}$ is provided with the switch $K_1$, and the detection resistor $R_{01}$ is provided with the switch $K_2$. Alternatively, as shown in FIG. 2, the respective switches include switches $K_1$, $K_2$ and $K_4$, the anti-PID power supply $V_{PID}$ operates only when $K_1$ and $K_2$ are closed, and both the anti-PID power supply $V_{PID}$ and the detection resistor $R_{02}$ operate only when $K_1$ and $K_4$ are closed. Alternatively, as shown in FIG. 3, the respective switches include switches $K_1$ to $K_4$, the anti-PID power supply $V_{PID}$ operates only when $K_1$ and $K_2$ are closed, both the anti-PID power supply $V_{PID}$ and the detection resistor $R_{01}$ operate only when $K_1$ and $K_3$ are closed, and the anti-PID power supply $V_{PID}$ and the detection resistor $R_{02}$ operate only when $K_1$ and $K_4$ are closed.

Figure 4:
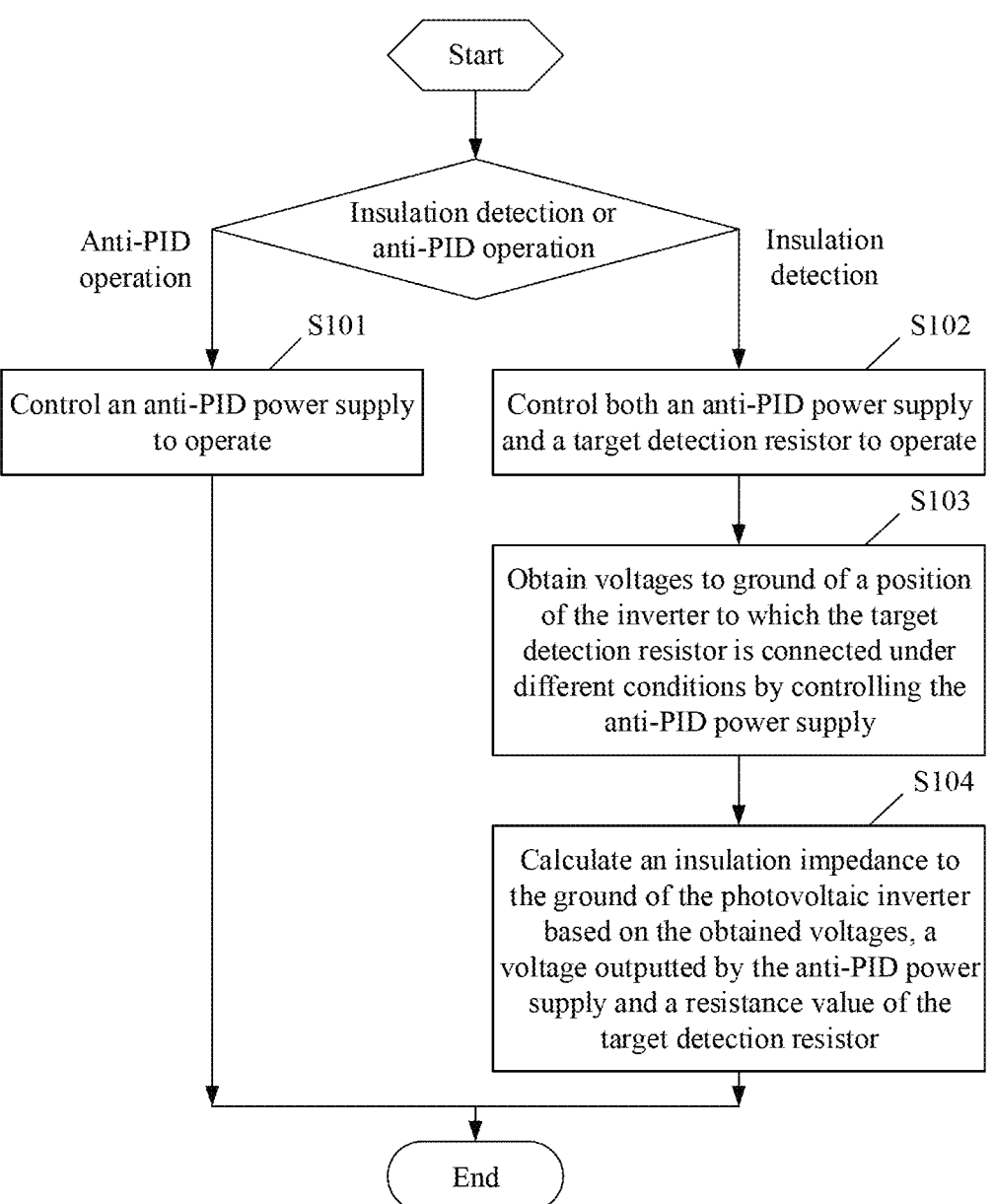
FIG. 4 is a flowchart of a method for controlling a photovoltaic power generation system according to an embodiment of the present disclosure.

As shown in FIG. 4, the method for controlling the photovoltaic power generation system includes S101 during the anti-PID operation, and S102, S103, and S104 during the insulation detection.

In practical applications, a controller of the photovoltaic inverter may determine whether to perform the anti-PID operation or the insulation detection based on a current requirement, such as a received instruction. In an embodiment, during the anti-PID operation, the controller determines to perform the insulation detection in response to receiving an instruction for insulation detection, and the method proceeds from S101 to S102, and then continues to proceed S103 and S104.

In S101, only the anti-PID power supply is controlled to operate.

For the structure shown in FIG. 1, a branch where the anti-PID power supply $V_{PID}$ is located is connected between the negative electrode of the DC bus and the ground by closing the switch $K_1$, and the detection resistor $R_{01}$ is bypassed by closing the switch $K_2$, thus being disconnected from the branch, such that only the anti-PID power supply $V_{PID}$ operates.

For the structure shown in FIG. 2, the branch where the anti-PID power supply $V_{PID}$ is located is connected between the negative electrode of the DC bus and the ground by closing the switches $K_1$ and $K_2$, and the detection resistor $R_{02}$ is disconnected from the branch by opening the switch $K_4$, such that only the anti-PID power supply $V_{PID}$ operates.

For the structure shown in FIG. 3, the branch where the anti-PID power supply $V_{PID}$ is located is connected between the negative electrode of the DC bus and the ground by closing the switches $K_1$ and $K_2$, the detection resistor $R_{01}$ is disconnected from the branch by opening the switch $K_3$, and the detection resistor $R_{02}$ is disconnected from the branch by opening the switch $K_4$, such that only the anti-PID power supply $V_{PID}$ operates.

When only the anti-PID power supply $V_{PID}$ operates, the negative voltage of the DC bus in FIG. 1, FIG. 2, or FIG. 3 is boosted, thus suppressing the PID effect.

In S102, both the anti-PID power supply and a target detection resistor are controlled to operate.

The target detection resistor may refer to the detection resistor $R_{01}$ in FIG. 1 or FIG. 3, or the detection resistor $R_{02}$ in FIG. 2 or FIG. 3, thereby detecting different insulation impedances to the ground of the photovoltaic inverter in the photovoltaic power generation system, which is not limited herein, depending on the requirements of the application process.

For the structure in FIG. 1, a branch formed by the anti-PID power supply $V_{PID}$ and the detection resistor $R_{01}$ is connected between the negative electrode of the DC bus and the ground by closing the switch $K_1$ and opening the switch $K_2$. That is, the target detection resistor refers to the detection resistor $R_{01}$ in FIG. 1.

For the structure in FIG. 2, a branch formed by the anti-PID power supply $V_{PID}$ and the detection resistor $R_{02}$ is connected between a corresponding phase of the AC side and the ground by closing the switches $K_1$ and $K_4$, and opening the switch $K_2$. That is, the target detection resistor refers to the detection resistor $R_{02}$ in FIG. 2.

For the structure in FIG. 3, a branch formed by the anti-PID power supply $V_{PID}$ and the detection resistor $R_{01}$ is connected between the negative electrode of the DC bus and the ground by closing the switches $K_1$ and $K_3$ and opening the switches $K_2$ and $K_4$, that is, the target detection resistor refers to the detection resistor $R_{01}$ in FIG. 3. Alternatively, a branch formed by the anti-PID power supply $V_{PID}$ and the detection resistor $R_{02}$ is connected between a corresponding phase of the AC side and the ground by closing the switches $K_1$ and $K_4$ and opening the switches $K_2$ and $K_3$, that is, the target detection resistor refers to the detection resistor $R_{02}$ in FIG. 3.

In S103, voltages to the ground of a position of the photovoltaic inverter to which the target detection resistor is connected under different conditions are obtained by controlling the anti-PID power supply.

When the target detection resistor is a detection resistor arranged between the DC side of the photovoltaic inverter and the ground, a voltage of the position of the inverter to which the target detection resistor is connected refers to a voltage of the DC bus to the ground. When only the switch $K_1$ is closed in FIG. 1, or only the switches $K_1$ and $K_3$ are closed in FIG. 3, the target detection resistor is a detection resistor arranged between the negative electrode of the DC side of the photovoltaic inverter and the ground, that is, the detection resistor $R_{01}$ as shown in FIG. 1 and FIG. 3. The position of the inverter to which the target detection resistor is connected may refer to the negative electrode of the DC bus. Therefore, the voltage to the ground of the position of the inverter to which the target detection resistor is connected is a voltage to the ground of the negative electrode of the DC bus of the photovoltaic inverter. In such case, the process of obtaining the voltages to the ground of the position of the inverter to which the target detection resistor is connected under different conditions includes obtaining voltages to the ground of the negative electrode of the DC bus under different conditions. In practical application, in a case that a preceding stage of an inverter circuit of the photovoltaic inverter is provided with at least one DC/DC conversion circuit, and a side of the at least one DC/DC conversion circuit connected to a photovoltaic module and the DC bus are in common negative connection, the target detection resistor is the detection resistor arranged between the negative electrode of the DC side of the photovoltaic inverter and the ground, and the position of the inverter to which the target detection resistor is connected is a negative electrode of the side of the at least one DC/DC conversion circuit connected to the photovoltaic module. In such case, voltages of positions in common negative connection are equal to each other, and thus the voltage to the ground of the position of the inverter to which the target detection resistor is connected is still the voltage to the ground of the negative electrode of the DC bus of the photovoltaic inverter.

When only the switches $K_1$ and $K_4$ are closed in FIG. 2 or FIG. 3, the target detection resistor refers to the detection resistor arranged between one phase of the AC side of the photovoltaic inverter and the ground, that is, the detection resistor $R_{02}$ as shown in FIG. 2 and FIG. 3. The position of the inverter to which the target detection resistor is connected refers to the phase of the AC side of the photovoltaic inverter. Therefore, the voltage to the ground of the position of the inverter to which the target detection resistor is connected is the voltage to the ground of the phase of the AC side of the photovoltaic inverter. In such case, the process of obtaining the voltages to the ground of the position of the inverter to which the target detection resistor is connected under different conditions includes obtaining voltages to the ground of the phase of the AC side of the photovoltaic inverter under different conditions.

The anti-PID power supply is controlled to obtain different conditions in the following two manners. In an embodiment, the anti-PID power supply $V_{PID}$ in each figure is controlled to output different voltages, a voltage detection module detects the voltages to the ground of the position of the inverter to which the target detection resistor is connected under different output voltages and transmits detected voltages to the controller, such that the controller can obtain the voltages to the ground of the position of the inverter to which the target detection resistor is connected under different conditions. In another embodiment, the anti-PID power supply $V_{PID}$ in each figure is controlled to output a voltage, and the anti-PID power supply $V_{PID}$ is disconnected from the photovoltaic inverter. In other words, in practical application, only the anti-PID power supply is controlled to output different voltages, or both the voltage outputted by the anti-PID power supply and the switch are controlled, which is not limited here, depending on the application environment.

In S104, an insulation impedance to the ground of the photovoltaic inverter is calculated based on the obtained voltages, a voltage outputted by the anti-PID power supply and a resistance value of the target detection resistor.

Taking the structure in FIG. 1 as an example, a resistance value of the detection resistor $R_{01}$ in FIG. 1 is known, therefore, equations are listed based on the voltages to the ground of the negative electrode of the DC bus and the voltages outputted by the anti-PID power supply $V_{PID}$ under different conditions, an equation set is formed by simultaneous equations under different conditions, and the insulation impedance to the ground of the photovoltaic inverter is calculated by eliminating other unknown parameters. The process of listing the equations and the calculation is referred to the following descriptions.

With the method according to the embodiments of the present disclosure, during the anti-PID operation, only the anti-PID power supply is controlled to operate, and a voltage of a DC bus is boosted by using the anti-PID power supply, so as to suppress the PID effect. During the insulation detection, both the anti-PID power supply and the target detection resistor are controlled to operate, voltages to the ground of a position of the inverter to which the target detection resistor is connected under different conditions are obtained by controlling the anti-PID power supply, such as the voltage to the ground of the negative electrode of the DC bus of the photovoltaic inverter as shown in FIG. 1, so as to perform the insulation detection by using the anti-PID power supply. Then, the insulation impedance to the ground of the photovoltaic inverter can be calculated based on the obtained voltages, the voltage outputted by the anti-PID power supply and the resistance value of the target detection resistor. In other words, the present disclosure can solve the problem of the conflict between the insulation detection and the anti-PID operation in the conventional technology, so as to achieve the compatibility between the insulation detection and the anti-PID operation.

Moreover, the anti-PID power supply and the target detection resistor are controlled to operate, thus selectively performing the insulation detection or the anti-PID operation in the embodiments of the present disclosure, so that an insulation detection device in the conventional technology is not arranged, saving the hardware cost.

On the basis of the previous embodiment, in an embodiment, in the method, S103 may include: controlling the anti-PID power supply to be in two states, and obtaining the voltages to the ground of the position of the inverter to which the target detection resistor is connected in the two states. There may be multiple implementation manners for controlling the anti-PID power supply to be in the two states.

In an implementation manner, the process of controlling the anti-PID power supply to be in two states includes: controlling the anti-PID power supply to output different test voltages.

In this case, the S103 includes: controlling the anti-PID power supply to output two test voltages, and obtaining the voltage to the ground of a position of the inverter to which the target detection resistor is connected corresponding to each of the two test voltages. For example, as shown in FIG. 1, the voltage to the ground of the negative electrode of the DC bus corresponding to each test voltage is obtained. Alternatively, as shown in FIG. 2, the voltage to the ground of the corresponding phase of the AC side corresponding to each test voltage is obtained. Alternatively, as shown in FIG. 3, the voltage to the ground of the negative electrode of the DC bus corresponding to each test voltage is obtained, or the voltage to ground of the corresponding phase of the AC side corresponding to each test voltage is obtained.

In practical application, the test voltages differ in at least one of absolute values and directions. For example, the test voltages are two positive voltages with different absolute values, or two negative voltages with different absolute values, or a positive voltage and a negative voltage. In a case that the test voltages are a positive voltage and a negative voltage, the absolute values of the two voltages are the same or different from each other, depending on the actual application environment. All implementations fall within the protection scope of the present disclosure.

In an embodiment, a power supply being capable of outputting both a positive voltage and a negative voltage serves as the anti-PID power supply. Alternatively, a power supply being capable of only outputting a positive voltage serves as the anti-PID power supply, and the switches are arranged to provide a positive output branch and a negative output branch for the anti-PID power supply, in order to save cost. Taking the structure in FIG. 1 as an example, referring to FIG. 5, the switches $S_1$ to $S_5$ are provided. When the switches $S_1$ and $S_2$ are closed, and the switches $S_4$ and $S_5$ are opened, the anti-PID power supply $V_{PID}$ outputs a positive voltage to the negative electrode PV− of the DC bus. When the switches $S_1$ and $S_2$ are opened, and the switches $S_4$ and $S_5$ are closed, the anti-PID power supply $V_{PID}$ outputs a negative voltage to the negative electrode PV− of the DC bus.

Figure 5:
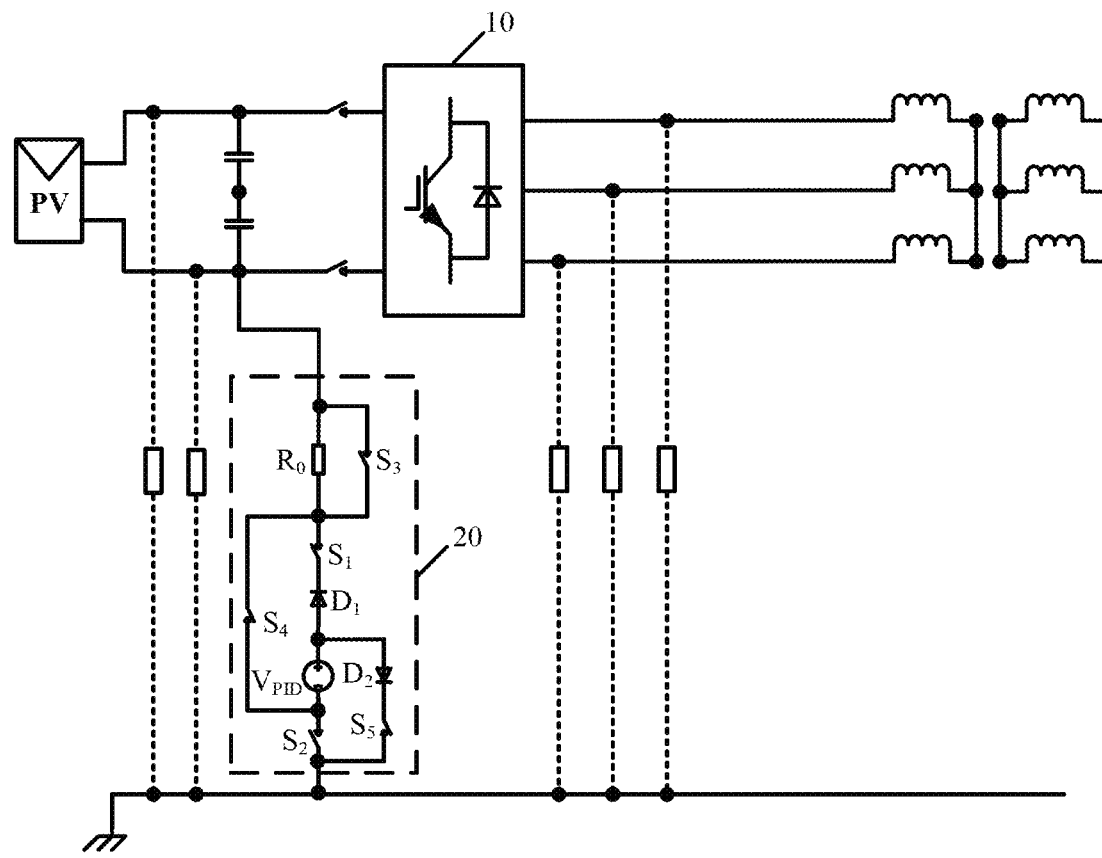
FIG. 5 is a schematic structural diagram of a photovoltaic inverter according to another embodiment of the present disclosure.

As shown in FIG. 5, the switches $S_1$, $S_2$, and $S_3$ are closed during performing the anti-PID operation. In response to receiving the instruction for insulation detection, the switch $S_3$ is first opened, the anti-PID power supply $V_{PID}$ is switched to a constant voltage mode and outputs a constant test voltage $V_1$. After the voltage to the ground of the negative electrode PV− of the DC bus (that is, the voltage to the ground of the negative electrode of the DC bus described above) is stable, the voltage to the ground of the negative electrode of the DC bus is recorded as $V_{pv1}$. Then, the anti-PID power supply $V_{PID}$ is switched to output a test voltage $V_2$, and the voltage to the ground of the negative electrode of the DC bus is recorded as $V_{pv2}$ after the voltage to the ground of the negative electrode PV− of the DC bus is stable again. In such case, an equivalent circuit diagram for detection is shown in FIG. 6.

Figure 6:
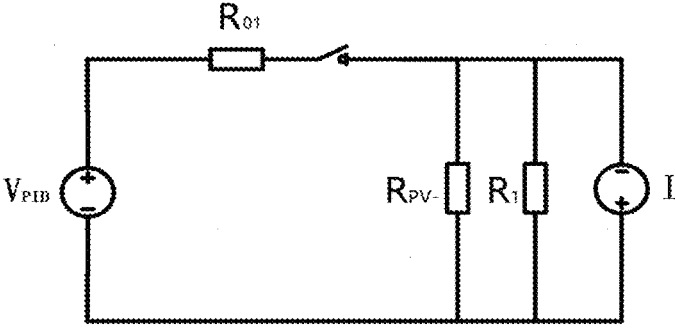
FIG. 6 is a schematic structural diagram of an insulation detection equivalent circuit according to an embodiment of the present disclosure.

In FIG. 6, $R_{PV-}$ represents an impedance to the ground of the negative electrode PV− of the DC bus of the photovoltaic inverter. $R_1$ represents an impedance to the ground of the positive electrode PV+ of the DC bus in a case that the photovoltaic inverter is in an off-grid state, while $R_1$ represents a coupling impedance of the positive electrode PV+ of the DC bus and the AC side in a case that the photovoltaic inverter is in a grid-connected state. Hereinafter, $R_S$ represents an impedance of $R_1$ and $R_{PV-}$ connected in parallel, that is, the insulation impedance to the ground of the photovoltaic inverter, which may be referred to as a system impedance. A constant current source I represents an influence of other loops on a detected loop of the negative electrode PV− of the DC bus, which is a dynamic variable that changes with the change of the system impedance $R_S$, and is a positive value or a negative value.

When the anti-PID power supply $V_{PID}$ outputs the test voltage $V_1$, the following equation is obtained as:

$$V_{pv1} = \left( I + \frac{V_1 - V_{pv1}}{R_{01}} \right) R_S$$

When the anti-PID power supply $V_{PID}$ outputs the test voltage $V_2$, the following equation is obtained as:

$$V_{pv2} = \left( I + \frac{V_2 - V_{pv2}}{R_{01}} \right) R_S$$

A linear equation in two unknowns is formed by the above two simultaneous equations, and the system impedance $R_S$ is calculated as:

$$R_S = \frac{V_{pv1} - V_{pv2}}{(V_1 - V_{pv1}) - (V_2 - V_{pv2})} R_{01}$$

In another implementation manner, the process of controlling the anti-PID power supply to be in two states includes: controlling the anti-PID power supply to output different test voltages, such as $V_1$ and $V_2$. In an embodiment, in one of the two states, the anti-PID power supply outputs one of the test voltages (such as $V_2$) that is the same as the voltage to the ground of the position of the inverter to which the target detection resistor is connected, such as the voltage to the ground of the negative electrode of the DC bus in FIG. 1. The method further includes: disconnecting the target detection resistor from the photovoltaic inverter in this state. Taking the structure in FIG. 1 as an example, the target detection resistor is disconnected from the photovoltaic inverter by opening the switch $K_1$ in FIG. 1 or the switch $S_3$ in FIG. 5. In the other state, the anti-PID power supply outputs the other test voltage (such as $V_1$) that is different from the voltage to the ground of the position of the inverter to which the target detection resistor is connected (such as the voltage to the ground of the negative electrode of the DC bus in FIG. 1).

When the anti-PID power supply $V_{PID}$ outputs the test voltage $V_1$, the following equation is obtained as:

$$V_{pv1} = \left(I + \frac{V_1 - V_{pv1}}{R_{01}}\right)R_S$$

When the anti-PID power supply $V_{PID}$ outputs the test voltage $V_2$, a potential of the anti-PID power supply $V_{PID}$ is equal to a potential of the negative electrode PV− of the DC bus, that is:

$$V_{pv2} = IR_S$$

A linear equation in two unknowns is formed by the above two simultaneous equations, and the system impedance $R_S$ is calculated as:

$$R_S = \frac{V_{pv1} - V_{pv2}}{V_1 - V_{pv1}}R_{01}$$

In another implementation manner, the process of controlling the anti-PID power supply to be in two states includes: controlling the anti-PID power supply to output a test voltage, and disconnecting the anti-PID power supply from the photovoltaic inverter. That is, the process of outputting the test voltage $V_2$ in the above two implementation manners is changed to disconnecting the anti-PID power supply from the photovoltaic inverter.

When the anti-PID power supply $V_{PID}$ outputs the test voltage $V_1$, the following equation is obtained as:

$$V_{pv1} = \left(I + \frac{V_1 - V_{pv1}}{R_{01}}\right)R_S$$

When the anti-PID power supply $V_{PID}$ is disconnected from the photovoltaic inverter, only the current of the constant current source I flows through the system impedance $R_S$, $$V_{pv2} = IR_S$$

A linear equation in two unknowns is formed by the above two simultaneous equations, and the system impedance $R_S$ is calculated as:

$$R_S = \frac{V_{pv1} - V_{pv2}}{V_1 - V_{pv1}}R_{01}$$

The situations where the target detection resistor is $R_{02}$ in the structures shown in FIG. 2 and FIG. 3 may be deduced in the same way, which are not repeated herein.

All the above implementation manners are examples for S103, but not limited to this. Other manners can be used in practical applications, as long as the above system impedance $R_S$ can be solved, the manners fall within the protection scope of the present disclosure.

Figure 7:
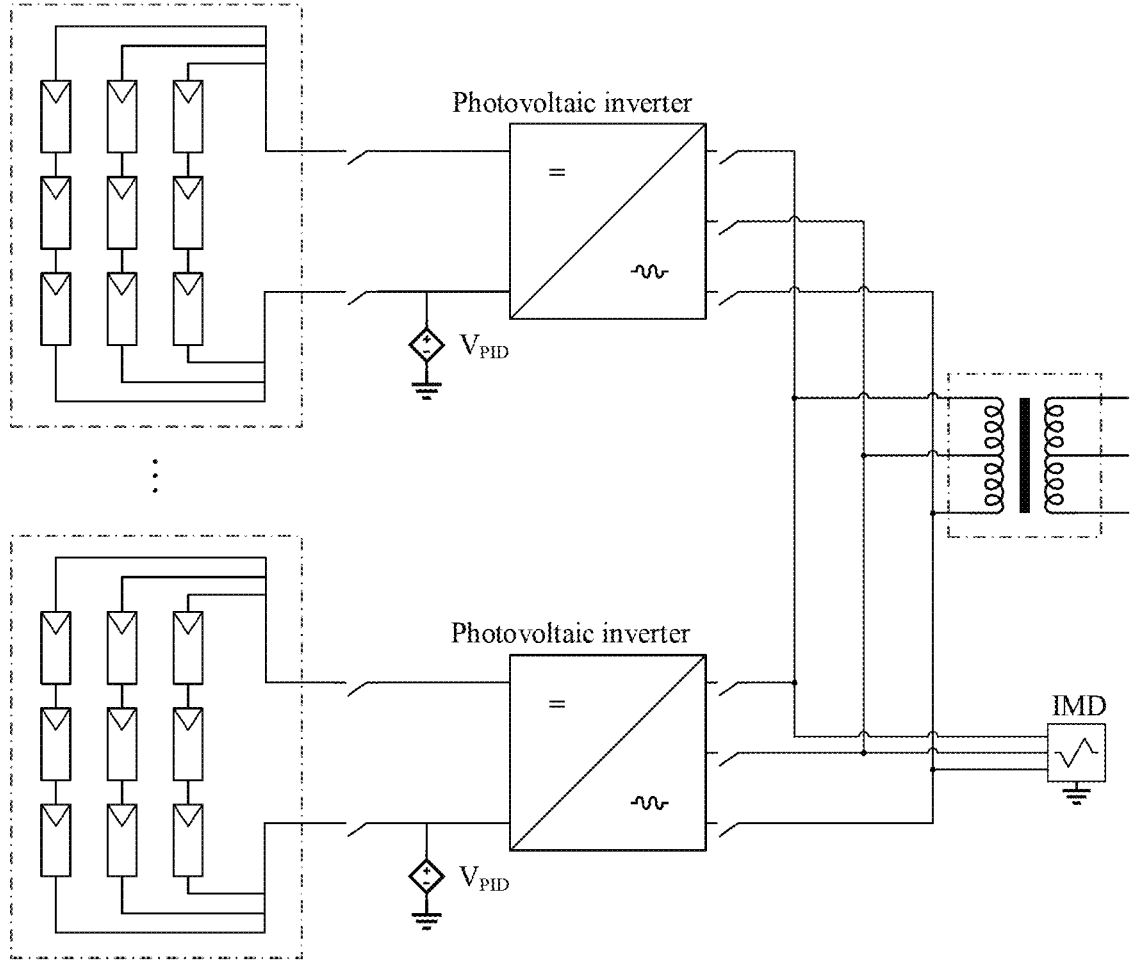
FIG. 7 is a schematic structural diagram of a photovoltaic power generation system according to an embodiment of the present disclosure.

It is worth noting that in the conventional technology, for the photovoltaic power generation system in FIG. 7, the DC side of each photovoltaic inverter is provided with the corresponding anti-PID power supply $V_{PID}$ for the anti-PID operation, and the AC side of the photovoltaic inverter is further provided with an insulation monitoring device (IMD) to achieve the insulation impedance detection of the AC side. Moreover, according to the requirements of an IEC standard, AC insulation detection is performed on the system for 24 hours. However, the anti-PID operation results in an existence of a grounding loop, and the AC insulation detection on the system fails to be performed all day due to the grounding loop.

In embodiments of the present disclosure, the equivalent resistance $R_1$ in FIG. 6 represents the impedance to the ground of the positive electrode PV+ of the DC bus in a case that the photovoltaic inverter is in the off-grid state, while $R_1$ represents the coupling impedance of the positive electrode PV+ of the DC bus and the AC side in a case that the photovoltaic inverter is in the grid-connected state. Therefore, in a case that the target detection resistor is the detection resistor $R_{01}$ shown in each figure, the system impedance $R_S$ calculated in the above implementation manners represents the insulation impedance to the ground of the DC side of the photovoltaic inverter in the off-grid state, and $R_S$ represents an insulation impedance to the ground of the DC side and the AC side of the photovoltaic inverter in the grid-connected state. In other words, with the method, the insulation impedance to the ground of the DC side during an off-grid operation may be detected, and the insulation impedance to the ground of the DC side and the AC side during a grid-connected operation may be detected. Moreover, regardless of the off-grid operation or the grid-connected operation, the photovoltaic inverter can perform the anti-PID operation as required. Therefore, for the above photovoltaic power generation system, each photovoltaic inverter can achieve the compatibility of the anti-PID operation and the AC insulation detection during the grid-connected operation, thereby solving the problem of failing to perform insulation detection all day in the conventional technology. Moreover, in the embodiments of the present disclosure, only the anti-PID power supply is changed without changing the existing photovoltaic inverter, that is, the detection resistors and the respective switches are arranged to achieve the compatibility of the insulation detection and the anti-PID operation without arranging the IMD for the AC insulation detection described above, and a Y-type resistor bridge for DC insulation detection in the conventional technology is not arranged. Therefore, according to the embodiments of the present disclosure, the cost is low, implementation is convenient, and the method is suitable for all inverters without distinguishing between models.

In addition, in a case that the target detection resistor is the detection resistor $R_{02}$ shown in the corresponding figure, the detailed process of S103 and S104 in the method is the same as above process, except that the voltage to the ground of the position of the inverter to which the target detection resistor is connected obtained in S103 is the voltage to the ground of the corresponding phase of the AC side of the photovoltaic inverter, instead of the voltage to the ground of the DC bus (such as the voltage to the ground of the negative electrode mentioned above). In this case, the insulation impedance to the ground calculated in S104 is the insulation impedance to the ground of the AC side of the photovoltaic inverter. The solution can also achieve the compatibility of the anti-PID operation and AC insulation detection during the grid-connected operation, and has the advantages of a low cost, a convenient implementation and is suitable for all inverters without distinguishing between models.

It should also be noted that during the process of S103, an off-grid/grid-connected state of the photovoltaic inverter if the anti-PID power supply is in one of the two states is different from an off-grid/grid-connected state of the photovoltaic inverter if the anti-PID power supply is in the other state, the system impedance $R_S$ under the two states changes, which is reflected in a change of the dynamic variable, i.e., the constant current source I involved in the above multiple implementation manners. Therefore, in order to ensure the accuracy of the detection process, the constant current source I in the two equations are always equal to each other in various implementation manners to ensure that the two equations can be solved simultaneously.

Therefore, the process of controlling the anti-PID power supply to be in two states, and obtaining the voltages to the ground of the position of the photovoltaic inverter to which the target detection resistor is connected in the two states includes: switching the anti-PID power supply between the two states at least twice, and obtaining the voltage to the ground of the position of the inverter to which the target detection resistor is connected after each switching until a difference between voltages obtained in one of the two states during successive two times of switching meets a predetermined difference requirement. The predetermined difference requirement indicates that the corresponding two voltages are the same or close, that is, a difference between the two voltages is within a range. The voltage to the ground of the position of the inverter to which the target detection resistor is connected may be the voltage to the ground of the negative electrode of the DC bus when the detection resistor $R_{01}$ is controlled to operate in FIG. 1 or FIG. 2, or the voltage to the ground of the corresponding phase of the AC side when the detection resistor $R_{02}$ is controlled to operate in FIG. 2 or FIG. 3.

Taking the controlling the detection resistor $R_{01}$ to operate in FIG. 1 or FIG. 2 in conjunction with the above implementation manner of S103 as an example, the anti-PID power supply is switched between outputting the test voltage $V_1$ and outputting the test voltage $V_2$ at least twice. For example, the anti-PID power supply is first controlled to output the test voltage $V_1$, then the anti-PID power supply is controlled to output the test voltage $V_2$, and next the anti-PID power supply is controlled to output the test voltage $V_1$. If the voltage $V_{pv1}$ to the ground of the negative electrode of the DC bus corresponding to the second test voltage $V_1$ is different from the voltage $V_{pv1}$ to the ground of the negative electrode of the DC bus corresponding to the first test voltage $V_1$, it indicates that the constant current source I changes when the anti-PID power supply is switched between outputting the two test voltages, that is, switching between the off-grid state and the grid-connected state occurs. In this case, the two equations cannot be solved simultaneously to calculate the system impedance $R_S$. While if the voltage $V_{pv1}$ to the ground of the negative electrode of the DC bus corresponding to the second test voltage $V_1$ is equal to the voltage $V_{pv1}$ to the ground of the negative electrode of the DC bus corresponding to the first test voltage $V_1$, it indicates that the constant current source I does not change when the anti-PID power supply is switched between outputting the two test voltages, that is, no switching between the off-grid state and the grid-connected state occurs. In this case, the two equations are solved simultaneously to calculate the system impedance $R_S$.

The above process can ensure that the voltages are detected in two adjacent times on condition of constant system impedance $R_S$, which can improve the detection accuracy. In an embodiment, only the anti-PID power supply is switched from one state to another state, that is, state switching once, and the voltages to the ground of the position of the inverter to which the target detection resistor is connected are obtained, which also fall within the protection scope of the present disclosure, depending on the actual application.

A photovoltaic inverter is further provided according to another embodiment of the present disclosure. As shown in FIG. 1 to FIG. 3, the photovoltaic inverter includes an inverter circuit 10, an anti-PID circuit 20, a voltage detection module (not shown), and a controller (not shown).

An AC side of the inverter circuit 10 is configured to connect a power grid and/or a load. In a grid-connected state, the AC side of the inverter circuit 10 is connected to the power grid, and is connected to or not connected to the load. In an off-grid state, the AC side of the inverter circuit 10 is disconnected from the power grid and is only connected to the load.

A DC side of the inverter circuit 10 is connected to the DC bus. In practical application, the DC bus may be directly connected to a corresponding photovoltaic module, such as at least one photovoltaic string (as shown in FIG. 1 to FIG. 3), or may be connected to the corresponding photovoltaic module through at least one DC/DC conversion circuit, such as, each DC/DC conversion circuit is connected to at least one photovoltaic string. In this case, one side of each DC/DC conversion circuit is connected to the corresponding photovoltaic string, and the other side of each DC/DC conversion circuit is connected to the DC bus.

A resistor is connected by a dotted line between the negative electrode of the DC bus and the ground, which represents the insulation resistance to the ground of the negative electrode at the DC side of the photovoltaic inverter, that is, $R_{PV-}$ in FIG. 6. A resistor is connected by a dotted line between the positive electrode of the DC bus and the ground, which represents the insulation resistance to the ground of the positive electrode at the DC side of the photovoltaic inverter, that is, $R_1$ in the off-grid state in FIG. 6. A resistor is connected by a dotted line between the AC side of the inverter circuit 10 and the ground, which represents the insulation resistance to the ground of the AC side of the photovoltaic inverter. In the grid-connected state, the insulation resistance to the ground of the AC side and the insulation resistance to the ground of the positive electrode of the DC side together form $R_1$ in FIG. 6.

The anti-PID circuit 20 includes an anti-PID power supply $V_{PID}$ and at least one detection resistor ($R_{01}$ and/or $R_{02}$). The anti-PID power supply $V_{PID}$ is arranged between the DC bus and the ground. In practical applications, the anti-PID power supply $V_{PID}$ may be arranged between the negative electrode of the DC bus and the ground, or between the positive electrode of the DC bus and the ground, depending on the requirements of the application scenario. The anti-PID power supply $V_{PID}$ arranged between the negative electrode of the DC bus and the ground is described hereinafter as an example.

A corresponding detection resistor ($R_{01}$ and/or $R_{02}$) is arranged between at least one side of the photovoltaic inverter and the ground. As shown in FIG. 1, the anti-PID circuit 20 includes the anti-PID power supply $V_{PID}$ and the detection resistor $R_{01}$ connected in series. Alternatively, as shown in FIG. 2, the anti-PID circuit 20 includes the anti-PID power supply $V_{PID}$ and the detection resistor $R_{02}$ connected in series. Alternatively, as shown in FIG. 3, the anti-PID circuit 20 includes the anti-PID power supply $V_{PID}$, and the detection resistors $R_{01}$ and $R_{02}$, where a branch formed by the anti-PID power supply $V_{PID}$ connected in series with the detection resistors $R_{01}$ is different from a branch formed by the anti-PID power supply $V_{PID}$ connected in series with the detection resistors $R_{02}$. The branch formed by the anti-PID power supply $V_{PID}$ connected in series with the detection resistor $R_{01}$ is connected between the DC bus and the ground, and each figure exemplarily illustrates that the branch is connected between the negative electrode of the DC bus and the ground. The branch formed by the anti-PID power supply $V_{PID}$ connected in series with the detection resistor $R_{02}$ is connected between one phase at the AC side of the photovoltaic inverter and the ground. FIG. 1 to FIG. 3 exemplarily illustrate position relationships between the anti-PID power supply $V_{PID}$ connected in series with the detection resistor, and the position relationship is not limited. The detection resistor $R_{01}$ and the detection resistor $R_{02}$ share one anti-PID power supply $V_{PID}$ in FIG. 3. In another embodiment, the two detection resistors may be connected in series with different anti-PID power supplies, depending on the application environment. All implementations fall within the protection scope of the present disclosure.

Moreover, the anti-PID power supply $V_{PID}$ and the detection resistor $R_{01}$ and $R_{02}$ are provided with respective switches. As shown in FIG. 1, the anti-PID power supply $V_{PID}$ is provided with a switch $K_1$, and the detection resistor $R_{01}$ is provided with a switch $K_2$. When the switch $K_1$ is closed, a branch where the anti-PID power supply $V_{PID}$ is located is connected between the negative electrode of the DC bus and the ground. When the switch $K_1$ is opened, the branch where the anti-PID power supply $V_{PID}$ is located is disconnected from the negative electrode of the DC bus and the ground. When the switch $K_2$ is closed, the detection resistor $R_{01}$ is bypassed, thus being disconnected from the negative electrode of the DC bus and the ground. When the switch $K_1$ is closed and the switch $K_2$ is opened, the anti-PID power supply $V_{PID}$ and the detection resistor $R_{01}$ are controlled to operate. For the structure in FIG. 2, the switches include switches $K_1$, $K_2$ and $K_4$. When only $K_1$ and $K_2$ are closed, the anti-PID power supply $V_{PID}$ is controlled to operate. When only $K_1$ and $K_4$ are closed, the anti-PID power supply $V_{PID}$ and the detection resistor $R_{02}$ are controlled to operate. Moreover, the switches $K_2$ and $K_4$ are mutually exclusive, that is, only one of them is closed at a time. For the structure in FIG. 3, the switches include switches $K_1$ to $K_4$, where the anti-PID power supply $V_{PID}$ is controlled to operate when only $K_1$ and $K_2$ are closed, the anti-PID power supply $V_{PID}$ and the detection resistor $R_{01}$ are controlled to operate when only $K_1$ and $K_3$ are closed, and the anti-PID power supply $V_{PID}$ and the detection resistor $R_{02}$ are controlled to operate when only $K_1$ and $K_4$ are closed. Moreover, the switches $K_2$, $K_3$ and $K_4$ are mutually exclusive, that is, only one of them is closed at a time.

In an embodiment, a power supply being capable of outputting both a positive voltage and a negative voltage serves as the anti-PID power supply. Alternatively, a power supply being capable of only outputting a positive voltage serves as the anti-PID power supply, depending on the application environment. All implementations fall within the protection scope of the present disclosure.

In a case that the anti-PID power supply $V_{PID}$ is capable of only outputting a positive voltage, the anti-PID power supply $V_{PID}$ may output positive voltages with different absolute values to the negative electrode PV– of the DC bus. The structure of the anti-PID circuit 20 is further improved to output a positive voltage or a negative voltage to the negative electrode PV– of the DC bus. For example, for the structure in FIG. 1, that is, the number of the detection resistor is 1 and the detection resistor is arranged between the DC bus, such as the negative electrode of the DC bus, and the ground, the structure of the anti-PID circuit 20 may be shown in FIG. 5. The switches include a first switch $S_1$, a second switch $S_2$, a third switch $S_3$, a fourth switch $S_4$, and a fifth switch $S_5$. The negative electrode of the DC bus is connected to the positive electrode of the anti-PID power supply $V_{PID}$ through the detection resistor $R_{01}$ and the first switch $S_1$ sequentially. The negative electrode of the anti-PID power supply $V_{PID}$ is connected to the ground through the second switch $S_2$. The third switch $S_3$ is connected in parallel with the detection resistor $R_{01}$. A branch formed by the first switch $S_1$ connected in series with the anti-PID power supply $V_{PID}$ is connected in parallel with the fourth switch $S_4$. A branch formed by the second switch $S_2$ connected in series with the anti-PID power supply $V_{PID}$ is connected in parallel with the fifth switch $S_5$.

As shown in FIG. 5, when the switches $S_1$ and $S_2$ are closed, and the switches $S_4$ and $S_5$ are opened, the anti-PID power supply $V_{PID}$ outputs a positive voltage to the negative electrode PV– of the DC bus. When the switches $S_1$ and $S_2$ are opened, and the switches $S_4$ and $S_5$ are closed, the anti-PID power supply $V_{PID}$ outputs a negative voltage to the negative electrode PV– of the DC bus. Therefore, in a case that a power supply being capable of only outputting a positive voltage serves as the anti-PID power supply $V_{PID}$, the anti-PID power supply $V_{PID}$ can output the positive voltage and negative voltage to the negative electrode PV– of the DC bus, thereby reducing a power supply cost.

Figure 8:
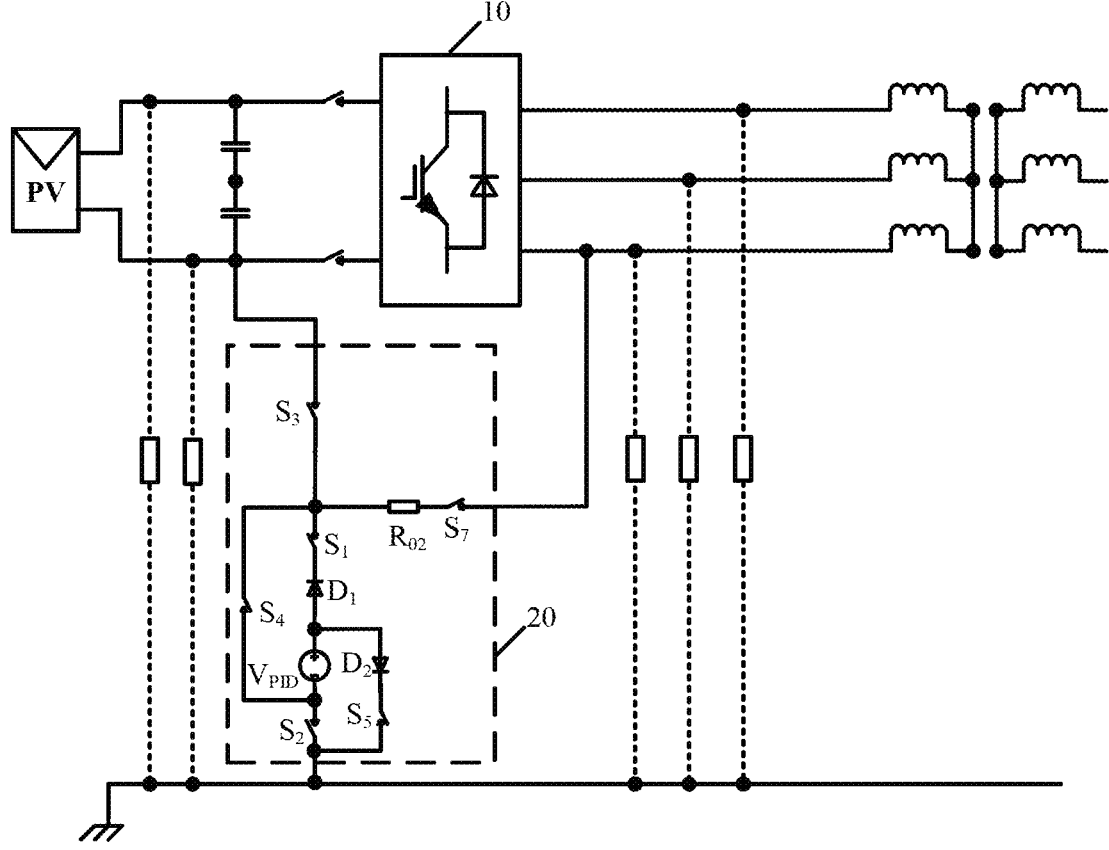
FIG. 8 is a schematic structural diagram of a photovoltaic inverter according to another embodiment of the present disclosure.

In another embodiment, for the structure in FIG. 2, that is, the number of the detection resistor is 1, and the detection resistor is arranged between one phase of the AC side of the photovoltaic inverter and the ground, the structure of the anti-PID circuit 20 may be shown in FIG. 8. The switches includes a first switch $S_1$, a second switch $S_2$, a third switch $S_3$, a fourth switch $S_4$, a fifth switch $S_5$, and a seventh switch $S_7$. The negative electrode of the DC bus is connected to a first terminal of the first switch $S_1$ through the third switch $S_3$. A second terminal of the first switch $S_1$ is connected to the positive electrode of the anti-PID power supply $V_{PID}$. The negative electrode of the anti-PID power supply $V_{PID}$ is connected to the ground through the second switch $S_2$. The seventh switch $S_7$ is connected in series with the detection resistor $R_{02}$ to form a branch, and the branch is connected between the phase of the AC side of the inverter circuit and the first terminal the first switch $S_1$. A branch formed by the first switch $S_1$ connected in series with the anti-PID power supply $V_{PID}$ is connected in parallel with the fourth switch $S_4$. A branch formed by the second switch $S_2$ connected in series with the anti-PID power supply $V_{PID}$ is connected in parallel with the fifth switch $S_5$. Moreover, the third switch $S_3$ and the seventh switch $S_7$ are mutually exclusive, that is, only one of them is closed at a time.

Figure 9:
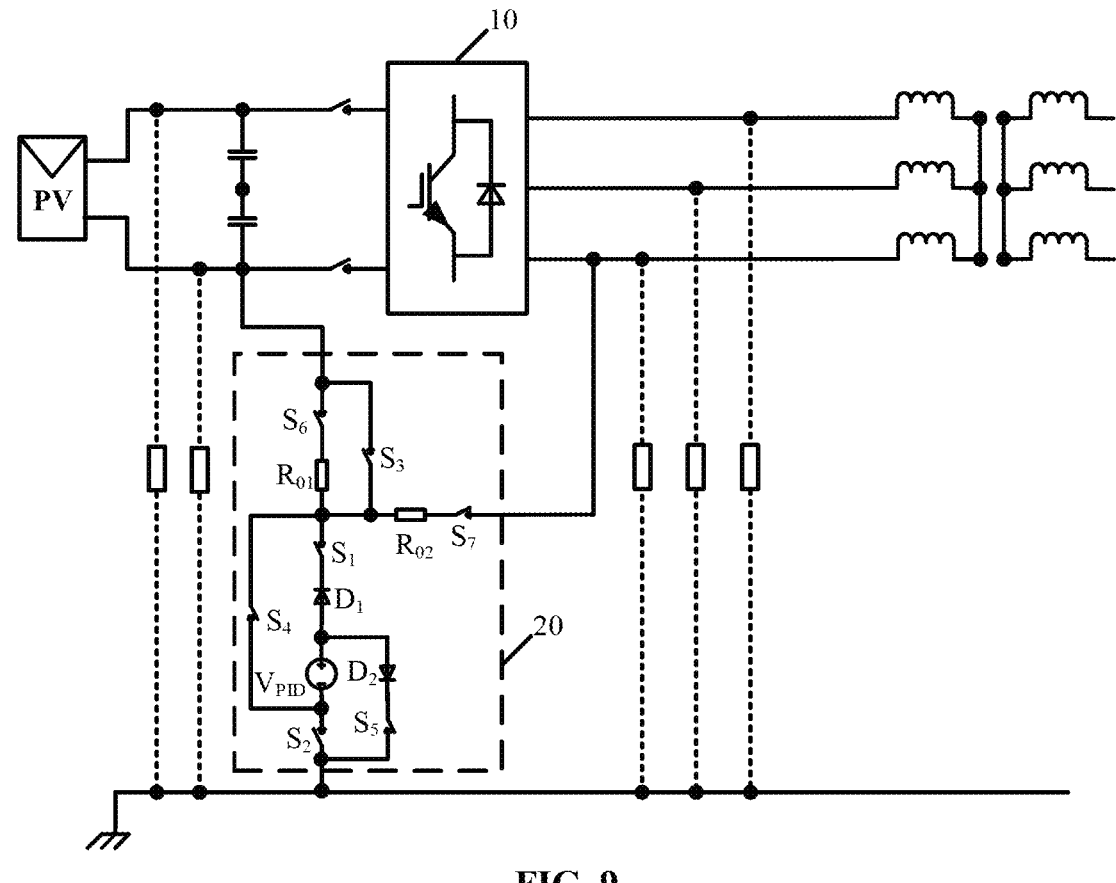
FIG. 9 is a schematic structural diagram of a photovoltaic inverter according to another embodiment of the present disclosure.

For the structure in FIG. 3, that is, the number of the detection resistors is 2. The detection resistors include a first detection resistor $R_{01}$ and a second detection resistor $R_{02}$. The structure of the anti-PID circuit 20 may be shown in FIG. 9, and the switches include a first switch $S_1$, a second switch $S_2$, a third switch $S_3$, a fourth switch $S_4$, a fifth switch $S_5$, a sixth switch $S_6$, and a seventh switch $S_7$. The negative electrode of the DC bus is connected to the first terminal of the first switch $S_1$ through the sixth switch $S_6$ and the first detection resistor $R_{01}$ connected in series. The seventh switch $S_7$ is connected in series with the second detection resistor $R_{02}$ to form a branch, and the branch is connected between the phase of the AC side of the inverter circuit and the first terminal of the first switch $S_1$. The second terminal of the first switch $S_1$ is connected to the positive electrode of the anti-PID power supply $V_{PID}$. The negative electrode of the anti-PID power supply $V_{PID}$ is connected to the ground through the second switch $S_2$. The third switch $S_3$ is connected in parallel with a branch formed by the first detection resistor $R_{01}$ connected in series with the sixth switch $S_6$. A branch formed by the first switch $S_1$ connected in series with the anti-PID power supply $V_{PID}$ is connected in parallel with the fourth switch $S_4$. A branch formed by the second switch $S_2$ connected in series with the anti-PID power supply $V_{PID}$ is connected in parallel with the fifth switch $S_5$. Moreover, the third switch $S_3$, the sixth switch $S_6$, and the seventh switch $S_7$ are mutually exclusive, that is, only one of them can be closed at a time.

In an embodiment, in order to ensure that a direction of the current flow follows the design and avoid current flowing back into the anti-PID power supply $V_{PID}$, a first diode $D_1$ and a second diode $D_2$ are arranged in the anti-PID circuit 20. The positive electrode of the anti-PID power supply $V_{PID}$ is connected to the first switch $S_1$ through the first diode $D_1$. The positive electrode of the anti-PID power supply $V_{PID}$ is connected to the fifth switch $S_5$ through the second diode $D_2$.

The inverter circuit 10 and the respective switches are controlled by the controller. The voltage detection module is configured to detect a voltage to the ground of a position of the inverter to which the target detection resistor is connected and a voltage outputted by the anti-PID power supply $V_{PID}$, and output the detected voltages to the controller. In a case that the target detection resistor is $R_{01}$, the voltage to the ground of the position of the inverter to which the target detection resistor is connected is a voltage to the ground of the negative electrode of the DC bus of the photovoltaic inverter. In a case that the target detection resistor is $R_{02}$, the voltage to the ground of the position of the inverter to which the target detection resistor is connected is a voltage to the ground of the corresponding phase of the AC side of the photovoltaic inverter.

The controller is configured to perform the method for controlling the photovoltaic power generation system according to any one of the above embodiments. The detailed process and principle of the method may be referred to the above embodiments, which are not repeated herein.

With the method, the photovoltaic inverter can achieve both the insulation detection and the anti-PID operation by means of the anti-PID circuit 20, depending on actual needs. In an embodiment, the target detection resistor is $R_{01}$, the insulation detection can be performed on the DC side during the off-grid operation, and the insulation detection can be performed on the AC side and the DC side during the grid-connected operation. For the structure in FIG. 3 and FIG. 8, the insulation detection can be performed on the DC side and AC side of the photovoltaic inverter, respectively. In addition, the structure of the anti-PID circuit 20 is simple and easy to be implemented, which has a low cost and a convenient implementation in a real time manner, and is suitable for various types of inverters.

A photovoltaic power generation system is further provided according to another embodiment of the present disclosure, which includes a photovoltaic array and at least one photovoltaic inverter connected to the photovoltaic array. The photovoltaic array includes at least one photovoltaic string. The photovoltaic inverter is the photovoltaic inverter described in any one of the above embodiments, and the structure and principle of the photovoltaic inverter may be referred to the above embodiments, which are not repeated herein.

It is worth noting that the photovoltaic inverter may be a central inverter, or a string inverter. In a case that the photovoltaic inverter is the central inverter, at least one maximum power point tracking (MPPT) branch is arranged between the photovoltaic inverter and the photovoltaic array, which is not described in detail, depending on the application environment.

In addition, in the photovoltaic power generation system, the number of the photovoltaic inverter may be one or more, depending on the application environment.

Regardless of the structure of the photovoltaic power generation system, as long as the insulation detection can be compatible with the anti-PID operation for the photovoltaic inverter by the method described in any one of the above embodiments, the structure is fall within the protection scope of the present disclosure. Other structures of the photovoltaic power generation system may be referred to the conventional technology, which are not repeated herein.

The same or similar parts among the embodiments in this specification may be referred to each other, and each of the embodiments emphasizes differences from other embodiments. In particular, the system or system embodiment is basically similar to the method embodiment, and therefore is described relatively briefly. For relevant details, reference can be made to the corresponding description of the method embodiment. The system and system embodiments described above are only illustrative, in which the units described as separate components may or may not be physically separated, and the components shown as units may or may not be physical units, that is, may be located in one place, or distributed over multiple network elements. Some or all of the modules may be selected as needed to achieve the object of the solution of the embodiments. Those skilled in the art can understand and implement the solution without any creative effort.

Those skilled in the art may further realize that the units and algorithm steps of each example described in conjunction with the embodiments disclosed herein can be implemented by electronic hardware, computer software, or a combination of both. In order to clearly illustrate the interchangeability of hardware and software, compositions and steps of each example have been described in general terms of functionality in the above description. Whether these functions are performed in hardware or software depends on the specific application and design constraints of the technical solution. Those skilled in the art may implement the described functionality in various manners for each specific application, while such implementations should not be considered to be beyond the scope of the present disclosure.

Based on the above description of the disclosed embodiments, the features described in the different embodiments in this specification may be replaced or combined with each other, so that those skilled in the art can implement or use the present disclosure. Various modifications to these embodiments are apparent by those skilled in the art, and the generic principles defined herein may be implemented in other embodiments without departing from the spirit or scope of the present disclosure. Hence, the present disclosure is not limited to the embodiments disclosed herein, but shall conform to the widest scope in accordance with the principle and novel features disclosed herein.

The invention claimed is:

1. A method for controlling a photovoltaic power generation system, wherein in the photovoltaic power generation system,
an anti-potential induced degradation (anti-PID) power supply is arranged between ground and a direct-current (DC) bus of a photovoltaic inverter, at least one detection resistor connected in series with the anti-PID power supply is arranged between at least one side of the photovoltaic inverter and the ground, and the anti-PID power supply and the at least one detection resistor are provided with respective switches, the method comprises:
controlling only the anti-PID power supply to operate during an anti-PID operation;
controlling both the anti-PID power supply and a target detection resistor to operate during insulation detection;
obtaining voltages to the ground of a position of the photovoltaic inverter to which the target detection resistor is connected under different conditions by controlling the anti-PID power supply; and
calculating an insulation impedance to the ground of the photovoltaic inverter based on the obtained voltages, a voltage outputted by the anti-PID power supply and a resistance value of the target detection resistor.

2. The method for controlling the photovoltaic power generation system according to claim 1, wherein the obtaining voltages to the ground of a position of the photovoltaic inverter to which the target detection resistor is connected under different conditions by controlling the anti-PID power supply comprises:
controlling the anti-PID power supply to be in two states, and obtaining the voltages to the ground of the position of the photovoltaic inverter to which the target detection resistor is connected in the two states.

3. The method for controlling the photovoltaic power generation system according to claim 2, wherein the controlling the anti-PID power supply to be in two states comprises:
controlling the anti-PID power supply to output different test voltages.

4. The method for controlling the photovoltaic power generation system according to claim 3, wherein the test voltages differ in at least one of absolute values and directions.

5. The method for controlling the photovoltaic power generation system according to claim 3, wherein
in one of the two states, the anti-PID power supply outputs one of the test voltages that is the same as the voltage to the ground of the position of the photovoltaic inverter to which the target detection resistor is connected, wherein the method further comprises:
disconnecting the target detection resistor from the photovoltaic inverter in the state; and

in the other state, the anti-PID power supply outputs the other test voltage that is different from the voltage to the ground of the position of the photovoltaic inverter to which the target detection resistor is connected.

6. The method for controlling the photovoltaic power generation system according to claim 2, wherein the controlling the anti-PID power supply to be in two states comprises:
controlling the anti-PID power supply to output a test voltage; and
disconnecting the anti-PID power supply from the photovoltaic inverter.

7. The method for controlling the photovoltaic power generation system according to claim 2, wherein the controlling the anti-PID power supply to be in two states, and obtaining the voltages to the ground of the position of the photovoltaic inverter to which the target detection resistor is connected in the two states comprises:
switching the anti-PID power supply between the two states at least twice, and obtaining the voltage to the ground of the position of the photovoltaic inverter to which the target detection resistor is connected after each switching until a difference between voltages in one of the two states obtained during successive two times of switching meets a predetermined difference requirement; or
switching the anti-PID power supply from one of the two states to the other state, and obtaining the voltages to the ground of the position of the photovoltaic inverter to which the target detection resistor is connected in the two states.

8. The method for controlling the photovoltaic power generation system according to claim 1, wherein the target detection resistor is a detection resistor of the at least one detection resistor arranged between a DC side of the photovoltaic inverter and the ground, and the voltages to the ground of the position of the photovoltaic inverter to which the target detection resistor is connected are voltages to the ground of the DC bus; and
the insulation impedance to the ground is:
an insulation impedance to the ground of the DC side of the photovoltaic inverter in an off-grid state; or,
an insulation impedance to the ground of the DC side and an AC side of the photovoltaic inverter in a grid-connected state.

9. The method for controlling the photovoltaic power generation system according to claim 1, wherein the target detection resistor is a detection resistor of the at least one detection resistor arranged between one phase of the AC side of the photovoltaic inverter and the ground, and the voltages to the ground of the position of the photovoltaic inverter to which the target detection resistor is connected are voltages to the ground of the phase on the AC side of the photovoltaic inverter; and
the insulation impedance to the ground is an insulation impedance to the ground of the AC side of the photovoltaic inverter.

10. A photovoltaic inverter, comprising:
an inverter circuit;
an anti-potential induced degradation (anti-PID) circuit;
a voltage detection module; and
a controller, wherein
a direct-current (DC) side of the inverter circuit is connected to a DC bus, and an alternating-current (AC) side of the inverter circuit is configured to connect a power grid and/or a load;

the anti-PID circuit comprises an anti-PID power supply and at least one detection resistor connected in series with the anti-PID power supply, and the anti-PID power supply and the detection resistor are provided with respective switches;

the anti-PID power supply is arranged between the DC bus and ground, and the at least one detection resistor is arranged between at least one side of the photovoltaic inverter and the ground;

the inverter circuit and the respective switches are controlled by the controller;

the voltage detection module is configured to detect a voltage to the ground of a position of the photovoltaic inverter to which a target detection resistor of the at least one detection resistor is connected and a voltage outputted by the anti-PID power supply, and output the detected voltages to the controller; and the controller is configured to perform the method for controlling the photovoltaic power generation system according to claim 1.

11. The photovoltaic inverter according to claim 10, wherein the at least one detection resistor is in a quantity of 1 and is arranged between the DC bus and the ground;

the respective switches comprise a first switch, a second switch, a third switch, a fourth switch, and a fifth switch, wherein the DC bus is connected to a positive electrode of the anti-PID power supply through the at least one detection resistor and the first switch sequentially;

a negative electrode of the anti-PID power supply is connected to the ground through the second switch;

the third switch is connected in parallel with the at least one detection resistor;

a branch formed by the first switch connected in series with the anti-PID power supply is connected in parallel with the fourth switch; and a branch formed by the second switch connected in series with the anti-PID power supply is connected in parallel with the fifth switch.

12. The photovoltaic inverter according to claim 10, wherein the at least one detection resistor is in a quantity of 1 and is arranged between one phase of the AC side of the photovoltaic inverter and the ground;

the respective switches comprise a first switch, a second switch, a third switch, a fourth switch, a fifth switch, and a seventh switch, wherein, the DC bus is connected to a first terminal of the first switch through the third switch;

a second terminal of the first switch is connected to a positive electrode of the anti-PID power supply;

a negative electrode of the anti-PID power supply is connected to the ground through the second switch;

the seventh switch is connected in series with the at least one detection resistor to form a branch, and the branch is connected between the phase of the AC side of the inverter circuit and the first terminal of the first switch;

a branch formed by the first switch connected in series with the anti-PID power supply is connected in parallel with the fourth switch; and a branch formed by the second switch connected in series with the anti-PID power supply is connected in parallel with the fifth switch.

13. The photovoltaic inverter according to claim 10, wherein the at least one detection resistor is in a quantity of 2 and comprises a first detection resistor and a second detection resistor;

the respective switches comprise a first switch, a second switch, a third switch, a fourth switch, a fifth switch, a sixth switch, and a seventh switch, wherein, the sixth switch is connected in series with the first detection resistor to form a branch, and the branch is connected between the DC bus and a first terminal of the first switch;

the seventh switch is connected in series with the second detection resistor to form a branch, and the branch is connected between the phase of the AC side of the inverter circuit and the first terminal of the first switch;

a second terminal of the first switch is connected to a positive electrode of the anti-PID power supply;

a negative electrode of the anti-PID power supply is connected to the ground through the second switch;

the third switch is connected in parallel with a branch formed by the first detection resistor connected in series with the sixth switch;

a branch formed by the first switch connected in series with the anti-PID power supply is connected in parallel with the fourth switch; and a branch formed by the second switch connected in series with the anti-PID power supply is connected in parallel with the fifth switch.

14. The photovoltaic inverter according to claim 12, wherein one of the third switch and the seventh switch is closed at a time.

15. The photovoltaic inverter according to claim 13, wherein one of the third switch, the sixth switch, and the seventh switch is closed at a time.

16. The photovoltaic inverter according to claim 11, wherein the anti-PID circuit further comprises a first diode and a second diode; wherein, the positive electrode of the anti-PID power supply is connected to the first switch through the first diode; and the positive electrode of the anti-PID power supply is connected to the fifth switch through the second diode.

17. The photovoltaic inverter according to claim 10, further comprising at least one DC/DC conversion circuit, wherein one side of the at least one DC/DC conversion circuit is connected to a photovoltaic module, and the other side of the at least one DC/DC conversion circuit is connected to the DC bus.

18. A photovoltaic power generation system, comprising:

a photovoltaic array; and at least one photovoltaic inverter connected to the photovoltaic array, wherein the photovoltaic inverter is the photovoltaic inverter according to claim 10.

* * * * *